May 24, 1932.  W. A. DUNCAN  1,860,019
EQUALIZING TABLE SLIDE
Filed April 1, 1929   2 Sheets-Sheet 1
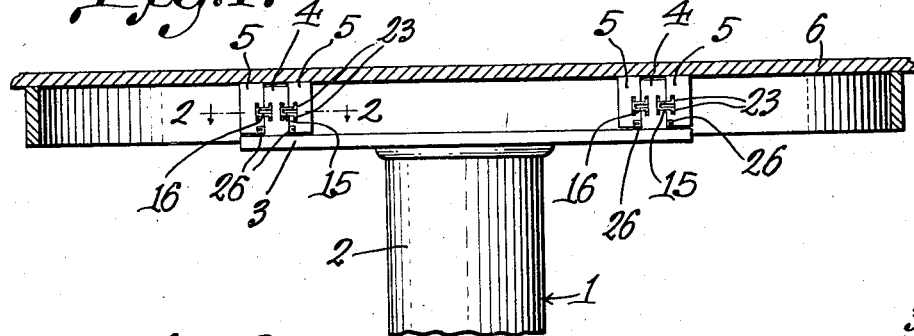
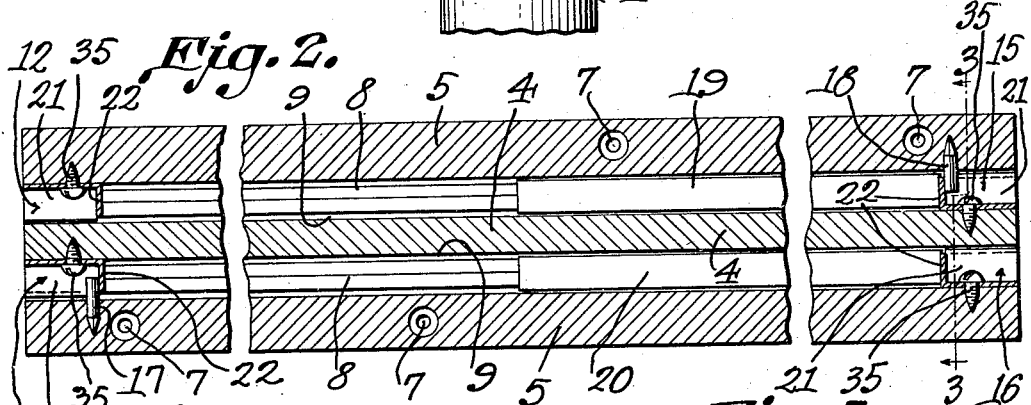
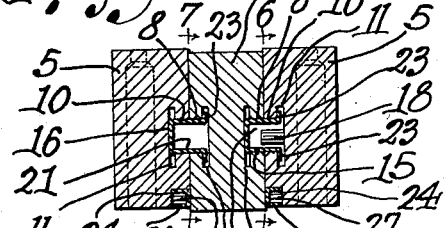
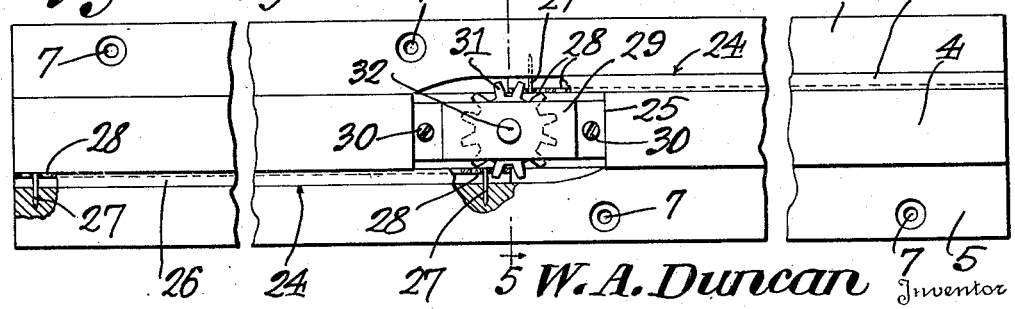
W. A. Duncan, Inventor
By C. A. Snow & Co.
Attorneys.

May 24, 1932.   W. A. DUNCAN   1,860,019
EQUALIZING TABLE SLIDE
Filed April 1, 1929   2 Sheets-Sheet 2
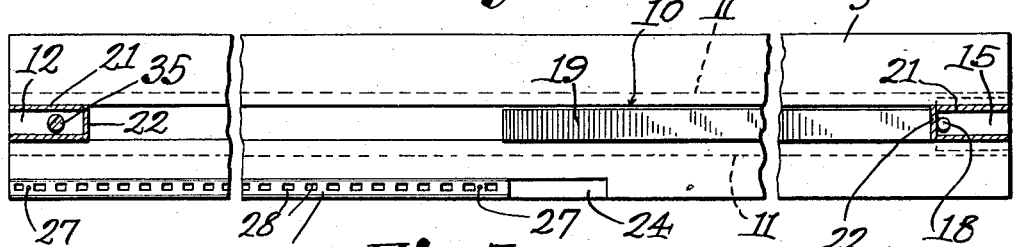
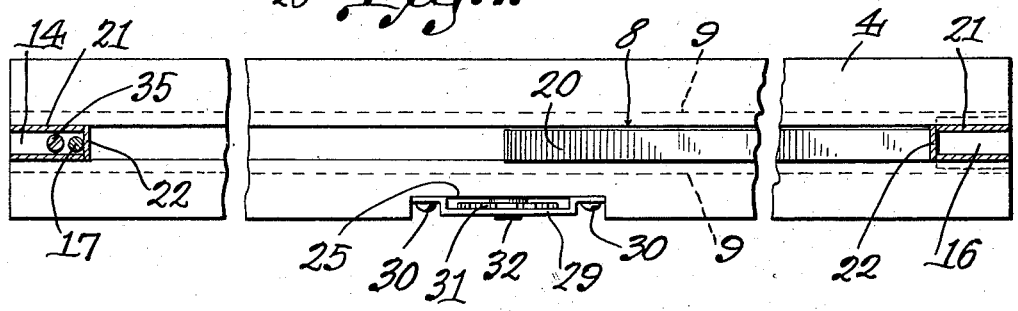
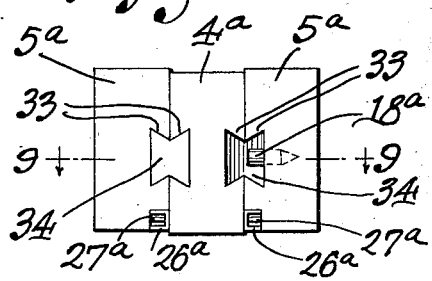
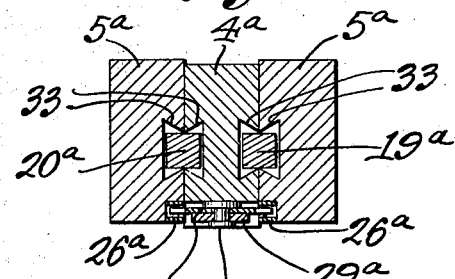
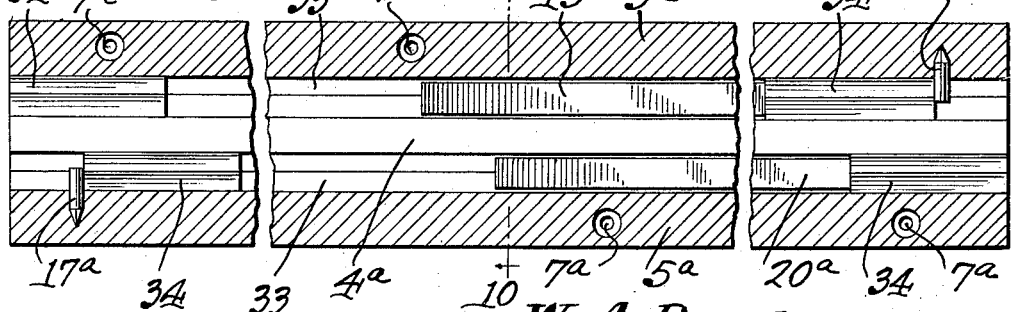

Patented May 24, 1932

1,860,019

UNITED STATES PATENT OFFICE

WILLIAM A. DUNCAN, OF STATESVILLE, NORTH CAROLINA

EQUALIZING TABLE SLIDE

Application filed April 1, 1929. Serial No. 351,713.

This invention aims to provide a novel equalizing device enabling the end portions of an extension table to be pulled apart or pushed together easily and smoothly, without regard to the force which is applied to the respective ends of the table. Another object of the invention is to provide a novel connector or guide uniting the parts of the table for relative sliding movement.

It is within the province of the disclosure to improve generally and to enhance the utility of devices of that sort to which the invention appertains.

A preferred form of the invention has been shown in the drawings; it will be understood, though, that a mechanic, working within the scope of what is claimed, may make such changes as his skill may suggest, without departing from the spirit of the invention.

In the accompanying drawings:—

Figure 1 shows, in end elevation, a device constructed in accordance with the invention, embodied in a table;

Figure 2 is a section on the line 2—2 of Figure 1;

Figure 3 is a transverse section on the line 3—3 of Figure 2;

Figure 4 is a bottom plan, wherein parts are broken away;

Figure 5 is a transverse section taken through the equalizing mechanism;

Figure 6 is a section on the line 6—6 of Figure 3;

Figure 7 is a section on the line 7—7 of Figure 3;

Figure 8 is an end elevation showing a modification;

Figure 9 is a section on the line 9—9 of Figure 8;

Figure 10 is a cross-section on the line 10—10 of Figure 9.

The device forming the subject matter of this application is adapted to be used in tables of widely different kinds, but, by way of illustration, the table is depicted as comprising a base 1 which includes a pedestal 2 on which a cap 3 is secured, in the usual manner.

Referring to the form shown in Figures 1 to 7, the device forming the subject matter of this application is made in pairs, as Figure 1 will show, but since these pairs are duplicates, but one member of the pair will be described.

The device includes an inner member 4, in the form of a beam, the member 4 being secured to the cap 3. Outer members 5, in the form of beams, slide longitudinal on each side of the inner member 4, the outer members being connected to the respective end sections 6 of the table. The openings 7, appearing in Figure 2, are for the reception of the securing elements whereby the outer members 5 are connected to the end sections of the table as aforesaid.

The inner member 4 is provided on each side with a longitudinal groove 8, at the inner end of which there is a slot 9 which is somewhat wider than the groove 8, a construction which will be understood readily when Figures 5 and 7 are compared. On the inner side of the outer members 5 there are longitudinal grooves 10, and slots 11 are located in the outer members 5, the slots 11 being somewhat wider than the grooves 10, as Figures 5 and 6 will show.

The invention comprises metal guides 12, 14, 15, and 16. Each guide includes a trough-shaped body 21, at the inner end of which there is wall 22 adapted to serve as an abutment. The body 21 is provided at its edges with outstanding flanges 23.

Referring to Figure 2, the guides 12, and 14 are located opposite to each other, at one end of the device, and the guides 15 and 16 are located opposite to each other, at the other end of the device. The guides 12 and 16 are secured to the outer members 5 at opposite ends of the device, and the guides 15 and 14 are secured to the respective sides of the inner member 4, at opposite ends of the device. The flanges 23 of the guide 12 and the flanges 23 of the guide 16 slide in the slots 9 of the inner member 4, whereas the flanges 23 of the guide 15 and of the guide 14 slide in the slots 11 of the outer members 5. One of the outer members 5 has a stop pin 17 adapted to cooperate with the abutment wall 22 of the guide 14; the other outer member 5 having a stop pin 18 that cooperates with the abutment wall 22 of the guide 15.

The stop pin 18 engages the guide 15, and the stop pin 17 engages the guide 14, when the end sections 6 of the table are pushed together. In order to limit the movement when the end sections 6 of the table are drawn apart, spacers 19 and 20, preferably in the form of wooden rods of rectangular cross-section, are provided, spacer 19 being freely slidable between the guides 15 and 12, spacer 20 being freely slidable between the guides 16 and 14. The spacers 19 and 20 are located in the longitudinal passages formed by the grooves 8 and 10 and the slots 9 and 11, an observation which will be readily understood when Figure 5 of the drawings is examined.

Having thus described the means whereby the parts 4 and 5 are slidably connected and limited in their sliding movement, reference will now be had to the equalizing mechanism, by which motion is transmitted to one end of the table, when the other end section of the table is pushed in or pulled out.

There are longitudinal recesses 24 in the lower surfaces of the outer members 5, the recesses 24 being disposed immediately adjacent to the inner member 4. The inner member 4 is provided on its lower surface and at a point intermediate its ends with a seat 25. Trough-shaped rack bars 26 are located in the recesses 24 and are held therein by securing elements 27. In what may be called the bases of the trough-shaped rack bars, there are openings 28. A bracket 29 is located in the seat 25 and is secured at 30 to the inner member 4. A pinion 31, disposed between the central part of the bracket 29 and the inner member 4, meshes with the openings 28 in the rack bars 26, the pinion being journaled on a stub shaft 32, carried by bracket 29. It is clear that when one of the outer members 5 is pushed or pulled in one direction motion will be transmitted to the other member 5 by the rack bars 26 and the pinion 31, an equalizing movement thus being accomplished with respect to the end sections 6 of the table.

It is not necessary that the metal guides 12, 14, 15, and 16 be used in connection with the equalizing mechanism. In Figures 8, 9, and 10, parts hereinbefore described have been designated by numerals previously used, with the suffix "a". In this form of the invention, the groove and slot construction shown at 8 and 9 and at 10 and 11 in Figure 3 is dispensed with, and the members 4a and 5a are provided with cooperating undercut grooves 33. The guides 34 are shaped to fit in the grooves 33. The guides 34 are glued in place upon the members to which they are secured, this gluing taking the place of the screws 35 that hold the guides 15, 16, 14, and 12 in Figure 2. Some persons may desire to secure the guides 34 in place otherwise than by gluing them, and this is permissible. Figures 8 to 10 show that the equalizing device may be used with a guide other than the metal guide of Figures 2 and 3, and the metal guide is not confined to use with the mechanism for equalizing.

Having thus described the invention, what is claimed is:—

Equalizing mechanism for an extension table, comprising an inner member, outer members slidable on opposite sides of the inner member, the outer members being provided with recesses, racks housed completely in the recesses and fitting closely therein, the racks being trough shaped in cross section and comprising approximately parallel flanges and a wall connecting the flanges, the wall having openings, and the free edges of the flanges abutting against the bases of the recesses, securing devices passing through the said walls of the racks and entering the outer members, a pinion meshing with the openings of the racks, and means for mounting the pinion for rotation on the inner member.

In testimony that I claim the foregoing as my own, I have hereto affixed my signature.

WILLIAM A. DUNCAN.